(12) United States Patent
Krishnamurthy et al.

(10) Patent No.: US 10,740,227 B2
(45) Date of Patent: Aug. 11, 2020

(54) RECLAIMING STORAGE RESOURCES

(71) Applicant: VMWARE, INC., Palo Alto, CA (US)

(72) Inventors: Pradeep Krishnamurthy, Bangalore (IN); Prasanna Aithal, Bangalore (IN); Asit Desai, Palo Alto, CA (US); Bryan Branstetter, Palo Alto, CA (US); Mahesh S Hiregoudar, Bangalore (IN); Prasad Rao Jangam, Palo Alto, CA (US); Rohan Pasalkar, Palo Alto, CA (US); Srinivasa Shantharam, Bangalore (IN); Raghavan Pichai, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 461 days.

(21) Appl. No.: 15/644,854

(22) Filed: Jul. 10, 2017

(65) Prior Publication Data
US 2018/0314632 A1 Nov. 1, 2018

(30) Foreign Application Priority Data

Apr. 28, 2017 (IN) .............................. 201741015143

(51) Int. Cl.
*G06F 12/00* (2006.01)
*G06F 12/02* (2006.01)
*G06F 9/455* (2018.01)
*G06F 3/06* (2006.01)

(52) U.S. Cl.
CPC .......... *G06F 12/0253* (2013.01); *G06F 3/067* (2013.01); *G06F 3/0608* (2013.01); *G06F 3/0665* (2013.01); *G06F 9/45558* (2013.01); *G06F 3/0659* (2013.01); *G06F 2009/45579* (2013.01); *G06F 2009/45583* (2013.01); *G06F 2212/702* (2013.01)

(58) Field of Classification Search
CPC .. G06F 12/0253; G06F 3/0665; G06F 3/0608; G06F 3/067; G06F 9/45558; G06F 2009/45579; G06F 3/0659; G06F 2212/702; G06F 2009/45583
See application file for complete search history.

(56) References Cited

U.S. PATENT DOCUMENTS 8,339,881 B2 * 12/2012 Danilak ............... G11C 16/349
                                                          365/201
9,460,008 B1 * 10/2016 Leshinsky ........... G06F 12/0238

* cited by examiner

*Primary Examiner* — Alexander Khong
(74) *Attorney, Agent, or Firm* — Fish & Richardson P.C.

(57) ABSTRACT

Methods, systems, and apparatus, including computer programs encoded on a computer storage medium, for reclaiming one or more portions of storage resources in a computer system serving one or more virtual computing instances, where the storage resources in the computer system are organized in clusters of storage blocks. In one aspect, a method includes maintaining a respective block tracking value for each storage block that indicates whether a call to reclaim the storage block is outstanding; determining, from the block tracking values, a respective cluster priority value for each of the clusters based on a count of storage blocks in the respective cluster for which a call to reclaim is outstanding; and reclaiming a first portion of storage resources in the computer system in accordance with the cluster priority values.

21 Claims, 6 Drawing Sheets

RECLAIMING STORAGE RESOURCES

RELATED APPLICATIONS

Benefit is claimed under 35 U.S.C. 119(a)-(d) to Foreign Application Serial No. 201741015143 filed in India entitled "RECLAIMING STORAGE RESOURCES", on Apr. 28, 2017, by VMware, Inc., which is herein incorporated in its entirety by reference for all purposes.

BACKGROUND

This specification relates to virtualized storage systems.

A virtual machine is a software-based abstraction of a physical computer system. A virtual machine is executed on a physical computer through the use of virtualization software typically referred to as a "hypervisor." A physical computer system, referred to herein as a host, can execute one or more virtual machines. The hypervisor is software that is logically interposed between and interfaces with a virtual machine and a physical computer system. In general, each virtual machine is configured to execute an operating system, referred to herein as a guest OS, and applications. In virtualized storage environments, storage systems often need to reclaim storage resources allocated to virtual machines when those storage resources are unused or no longer needed by the virtual machines.

Storage resource reclamation is especially important for storage systems that rely on a thin provisioning scheme for allocating storage resources. A storage system that relies on thin provisioning over-commits its available storage resources and as such often relies on reclaiming unused or unneeded storage resources for meeting its performance and reliability goals. However, despite its importance to virtualized storage systems, efficient storage resource reclamation continues to be a challenge for developers of those systems.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document generally describes techniques for reclaiming storage resources in a remote computer storage system. The remote computer storage system can process calls to reclaim storage resources in groups of calls based on the cluster of storage resources and/or the storage block affected by each reclamation call. Moreover, the remote computer storage system can prioritize the processing of reclamation calls for clusters and/or blocks that have the highest number of outstanding reclamation calls, i.e., reclamation calls that that are obtained but not processed.

The subject matter described in this specification can be implemented in particular embodiments so as to realize one or more of the following advantages. Reclamation calls can on average be processed faster. The latency associated with reclaiming storage resources that are most affected by reclamation calls can be reduced. Reclamation is asynchronous to receiving reclamation calls from virtual machines, which reduces latency of processing reclamation calls. Processing reclamation calls in batch at host reduces the required number of metadata writes for a large set of reclamation calls. Processing reclamation calls for larger units of storage resources leads to faster and more accurate space reclamation.

Figure 1:
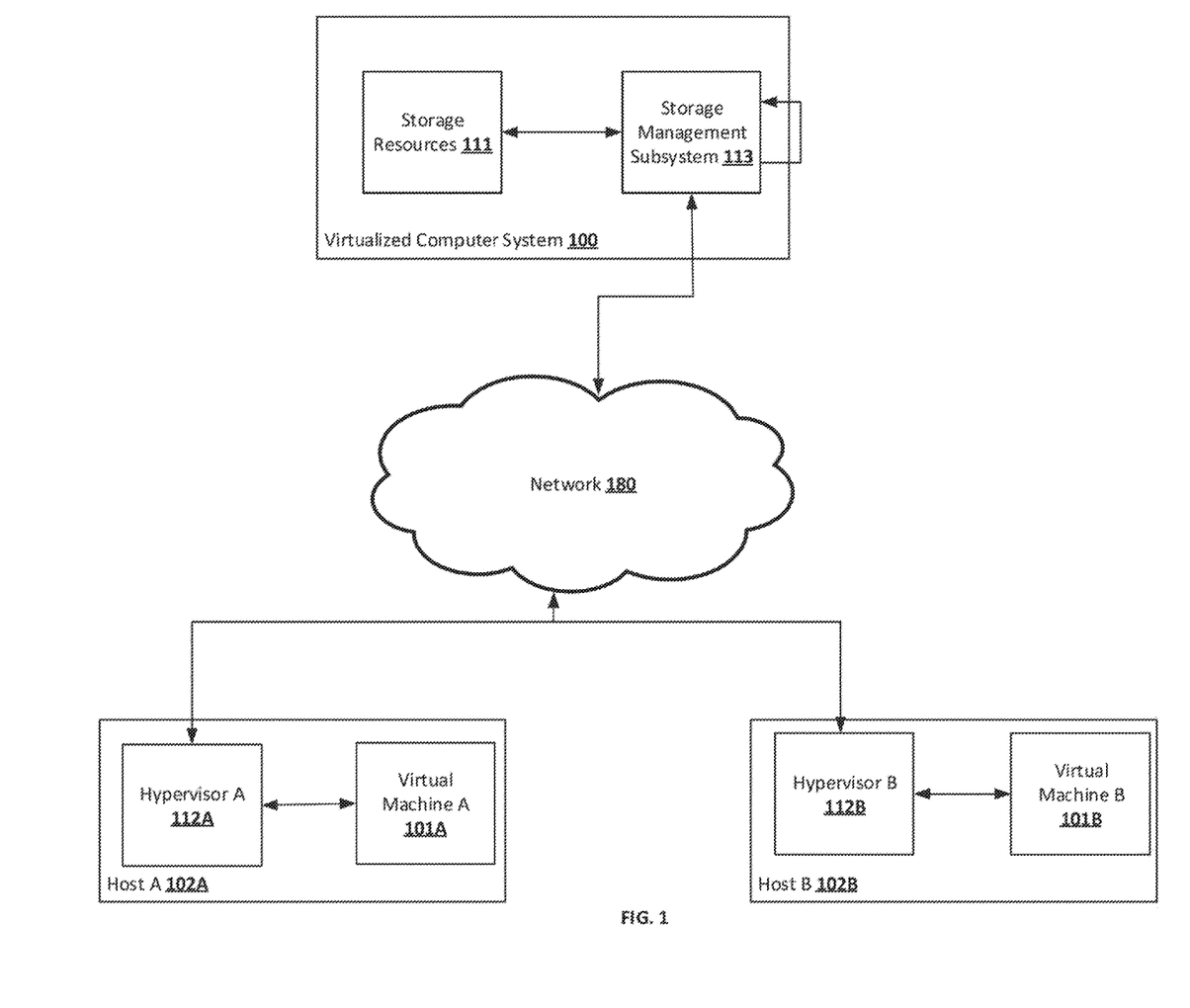
FIG. 1 illustrates an example remote computer storage system.

FIG. 1 illustrates an example remote computer storage system 100. The remote computer storage system 100 is an example of a system of one or more computers that is configured to provide remote computing resources, e.g., storage resources 111, to one or more virtual machines, e.g., virtual machine A 101A and virtual machine B 101B. The remote computer storage system 100 includes storage resources 111 and a storage management subsystem 113.

A virtual machine is a software-based abstraction of a physical computer system. The remote computer storage system 100 provides hardware and software capabilities related to provision and management of storage resources to a virtual machine. Each virtual machine resides on a host, e.g., host A 102 A for virtual machine A 101A and host B 102B for virtual machine B 101B. A host is a physical computer that runs one or more virtual machines using the computing resources provided by one or more remote computer storage systems, e.g., remote computer storage system 100. A host includes one or more data processing apparatuses that each can include a hardware platform. The hardware platform may include, for example, a processor (CPU), a memory management unit (MMU), memory (e.g., Random Access Memory (RAM)), local storage, a network adapter, and so on.

A host includes one or more hypervisors, e.g., hypervisor A 12A in host A 102A and hypervisor B 112B in host B. Each hypervisor is a virtualization software layer that executes one or more virtual machines on one or more hardware platforms that include the remote storage resources 111 of the remote computer storage system 100 of FIG. 1.

For each virtual machine, the hypervisor can manage a corresponding virtual hardware platform. Each virtual hardware platform includes emulated hardware. e.g., a virtual storage device, a virtual network adapter/interface, virtual memory, a virtual processor, and so on.

Each virtual machine managed by a hypervisor can execute a guest operating system that executes user applications. A hypervisor transforms input/output (I/O) requests from the guest OS to the corresponding virtual hardware platform into corresponding requests to the hardware platform.

Each virtual machine can also include virtual storage for storing data related to the virtual machine. The virtual storage can include a virtual memory and a virtual disk. The guest OS and/or the user applications can store data to and access data from the virtual memory and the virtual disk.

A hypervisor can map the virtual machines' virtual storage to storage resources 111 in the hardware storage. For example, when the guest OS writes data to virtual storage, the hypervisor can store the data in a corresponding location of storage resources 111 of the hardware platform based on the mapping. Similarly, when the guest OS requests data from virtual storage, the hypervisor can obtain the data from storage resources 111 and provide the data to the guest OS.

At each time, the remote computer storage system 100 allocates at least a portion of its storage resources to the virtual machines it serves. The remote computer storage system 100 can perform such an allocation in accordance with a thin provisioning method that relies on over-allocation of storage resources.

Each hypervisor interacts with, e.g., acquires, releases, and/or modifies, the computing resources provided by the remote computer storage system 100 by issuing calls, e.g., commands, requests, and/or indications, to the storage management subsystem 113 of the remote computer storage system 100. The calls can request that the storage management subsystem 113 modify allocation of storage resources to virtual machines.

For example, a hypervisor can issue a call to the storage management subsystem 113 releasing a target portion of the storage resources 111 allocated to a virtual machine managed by the hypervisor. Such a reclamation call is an indication by the hypervisor that the storage management system 113 can reclaim a target portion of storage resources 111 allocated to a virtual machine served by the hypervisor. By reclaiming a portion of storage resources 111 previously allocated to a virtual machine, the subsystem 113 deallocates the portion and marks it as available for re-allocation.

Although storage resources 111 are illustrated in FIG. 1 as being part of a single physical data storage device, the storage resources 111 can be distributed across multiple physical data storage devices in one or more physical locations. The storage resources 111 of the system 100 can include storage devices that are direct-attached storage (DAS) devices, are part of a storage area network (SAN), and/or are part of a virtual storage area network (vSAN). The storage resources 111 of the virtualized storage system 100 may be organized by the storage management subsystem 113 into clusters of storage blocks, where each cluster includes one or more storage blocks and each storage block includes one or more storage block segments. A storage block is a unit of storage resources 111. In a computer system that organizes storage resources according to a file system, e.g., the VMware Virtual Machine File System (VMFS), a storage block may be a block of storage resources allocated to a file, i.e., a file block. A storage block segment is a portion of a storage block, e.g., a portion of a file block storing one or more data records in a file. In some implementations, the storage management system 113 divides a storage block into respective storage block segments based on a granularity value for the storage block. In some of those implementations, the storage management system 113 divides the storage resources of the storage block into one or more storage block segments of equal size, where that size is equal to the granularity value for the storage block.

The storage management subsystem 113 allocates storage resources III to virtual machines. The storage management subsystem 113 also obtains and processes calls that require modifying allocation of storage resources 111 to virtual machines. An example of such a call is a reclamation call that releases a portion of storage resources allocated to a virtual machine. The storage management subsystem 113 may receive such a reclamation call from a hypervisor managing one or more virtual machines. The storage management subsystem 113 may also generate a reclamation call to itself to reclaim a portion of storage resources 111 allocated to one or more virtual machines if the subsystem 113 determines that managing allocation of storage resources 111 requires reclaiming resources already allocated to virtual machines. Generally, the storage management subsystem 113 does not effectively process each reclamation call as soon as it is received. This may be because when the subsystem 113 is managing storage resources for a large number of virtual machines, the subsystem 113 will obtain many reclamation calls and processing them as they are obtained becomes computationally infeasible or leads to inefficiencies. Instead, before processing a reclamation call, the subsystem 113 tracks the call to maintain a record of it. In particular, the subsystem 113 maintains tracking values for units of storage resources 111 and uses the tracking values to determine which portions of storage resources 113 to reclaim. When a reclamation call is obtained, the subsystem 113 modifies the tracking values of the units of storage resources 113 affected by the call to indicate that the reclamation call is outstanding rather than immediately process the reclamation call.

In some implementations, the subsystem 113 tracks a reclamation call using two types of tracking values: block tracking values and segment tracking values. For each storage block of a cluster, the subsystem 113 maintains a block tracking value that tracks reclamation calls releasing the storage block. By tracking a call using block tracking values, the subsystem 113 tracks the call on a cluster level. For each storage block segment of a storage block, the subsystem 113 maintains a segment tracking value that tracks reclamation calls releasing the storage block segment. By tracking a call using segment tracking values, the subsystem 113 tracks the call on a storage block level. The storage management subsystem 113 may store the tracking values on one or more storage devices, including storage devices that form the storage resources 11 of the remote computer storage system 101.

By maintaining tracking values both on the cluster level and on the storage block level the storage management subsystem 113 can separately track the effects of reclamation calls on entire storage blocks and on parts of storage blocks. In some implementations, the subsystem 113 tracks a reclamation call on a cluster level to the extent the target portion of the call includes one or more storage blocks that the call releases entirely. The subsystem 113 tracks a reclamation call on a storage block level to the extent the target portion of the call includes one or more storage block segments that the call releases without releasing the storage block including each segment entirely. In other implementations, the subsystem 113 tracks a reclamation call releasing entire storage blocks both on a cluster level and on a storage block level by updating segment tracking values of each storage block segment in any storage block released by the call entirely.

The storage management subsystem 113 can use the block and segment tracking values to determine the way in which it reclaims storage resources 111. For example, given that storage blocks are more spacious units of storage resources 111 than storage block segments, the system can prioritize reclaiming storage blocks whose block tracking value indicates that an entity, e.g., a hypervisor, has released the storage block entirely.

The storage management subsystem 113 tracks a reclamation call for a unit of storage resources 111, i.e., a storage block or a storage block segment, as long as such a call is outstanding. A reclamation call affecting a unit of storage resources 111 is outstanding if the subsystem 113 has obtained the call but has not processed it by reclaiming the unit. As long as a reclamation call affecting a unit of storage resource is outstanding, the subsystem 113 needs to maintain tracking values that indicate that outstanding state. After the subsystem 113 reclaims a unit of storage resources 111, however, the reclamation of the unit is no longer outstanding and the subsystem 113 can proceed to modify the tracking value corresponding to the unit to indicate that there is no outstanding reclamation call affecting the unit.

Reclaiming storage resources 111 based on information obtained from tracking calls to reclaim storage blocks is described in greater detail below with reference to FIG. 2. Reclaiming storage resources based on information obtained from tracking calls to reclaim storage block segments is described in greater detail below with reference to FIG. 3.

Figure 2:
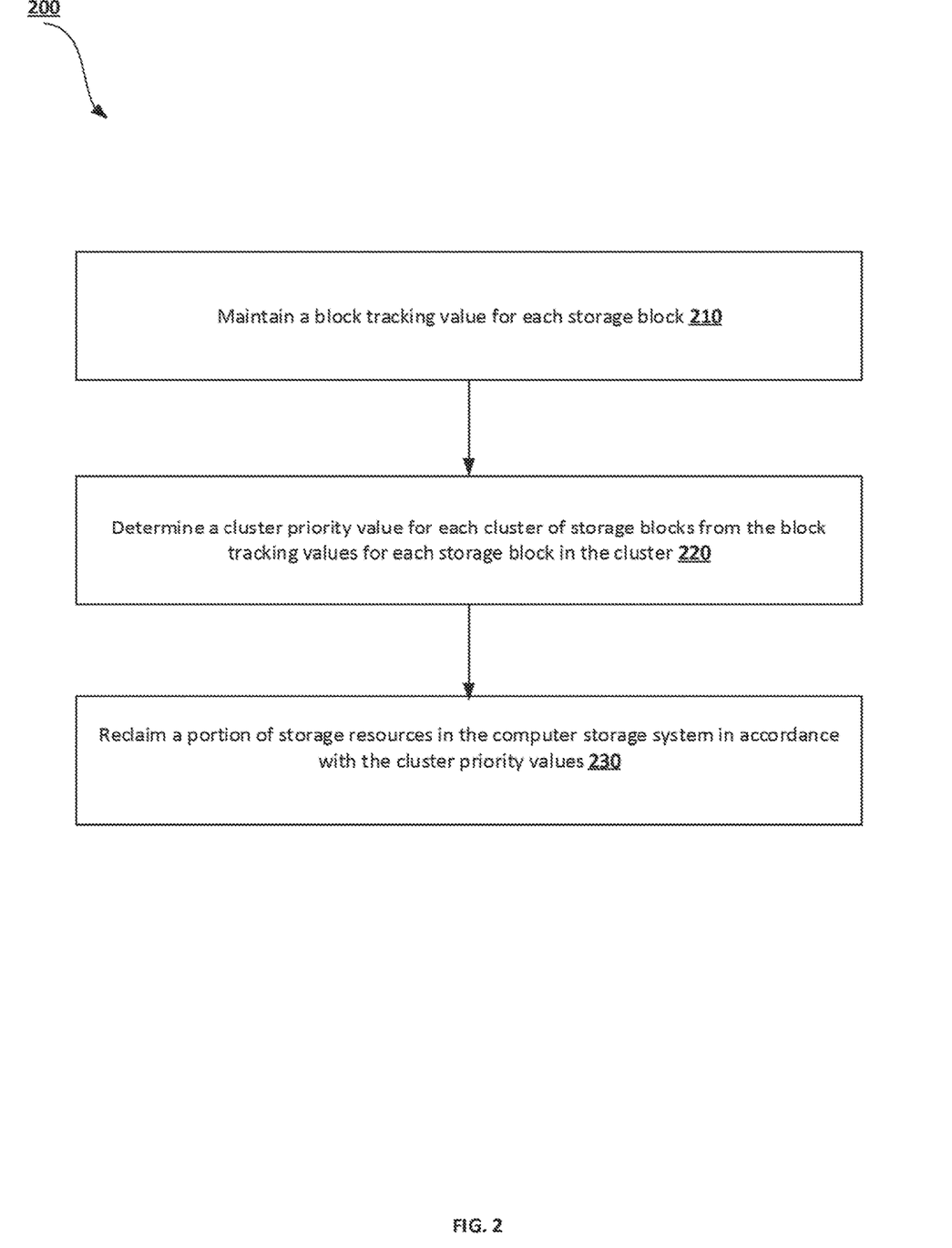
FIG. 2 is a flow chart of an example process for reclaiming storage resources in accordance with block tracking values.

FIG. 2 is a flow chart of an example process 200 for reclaiming storage resources in accordance with block tracking values. The process 200 is an example of a process performed by a system of one or more computers, e.g., the remote computer storage system 100 of FIG. 1.

The process 200 can be repeatedly performed by the remote computer storage system 100 to reclaim storage resources managed by the remote computer storage system 100 that are organized into clusters of storage blocks.

At step 210, the remote computer storage system 100 maintains a block tracking value for each storage block. A block tracking value for a storage block indicates whether a call to reclaim the storage block is outstanding. A call to reclaim a portion of storage resources, e.g., a storage block and/or a storage block segment, is outstanding if the remote computer storage system 100 has obtained the call but not processed it. The remote computer storage system 100 processes the call when the system 100 reclaims the portion of storage resources.

In some implementations, the remote computer storage system 100 maintains block tracking values on storage resources of the system, e.g., the storage resources 111 of remote computer storage system 100 of FIG. 1.

In some implementations, the remote computer storage system 100 maintains block tracking values on host computer systems, e.g., host A 102A and host B 102B of remote computer storage system 100 100 of FIG. 1.

In some implementations, the remote computer storage system 100 maintains block tracking values in two or more locations. For instance, the remote computer storage system 100 can maintain block tracking values both on the storage resources and on the host computer systems.

In some implementations, the remote computer storage system 100 maintains each block tracking value for a respective storage block as a value, e.g., a bit, that indicates whether a call to reclaim the storage block is outstanding.

The remote computer storage system 100 can update a block tracking value when it obtains a call to reclaim the storage block associated with the block tracking value to indicate that the remote computer storage system 100 has obtained the call and that the call is outstanding. The remote computer storage system 100 can also update the block tracking value when the system 100 reclaims the storage block associated with the block tracking value to indicate that a reclamation call is no longer outstanding for the storage block. Tracking reclamation calls is described in greater detail below with reference to FIG. 4.

At step 220, the remote computer storage system 100 determines a cluster priority value for each cluster of storage blocks from the block tracking values by determining whether the block tracking value for each storage block of the cluster indicates that a call to reclaim the storage block is outstanding. The remote computer storage system 100 can assign the cluster priority value based on factors in addition to whether the block tracking value for each storage block of the cluster indicates that a call to reclaim the storage block is outstanding.

In some implementations, the remote computer storage system 100 assigns each cluster priority value based on a ranking of the clusters by the count of storage blocks in each cluster whose block tracking value indicates that a call to reclaim the storage block is outstanding.

In some implementations, the remote computer storage system 100 can identify the clusters having the lowest and highest counts of storage blocks for which a call to reclaim is outstanding. The remote computer storage system 100 can assign a cluster priority value higher than other cluster priority values for other clusters to the particular cluster having the highest count. The remote computer storage system 100 can also assign a cluster priority value lower than other cluster priority values for other clusters to the particular cluster having the lower count. In some of those implementations, the remote computer storage system 100 assigns a medium priority value to any cluster other than the clusters having the lowest and highest counts of storage blocks for which a call to reclaim is outstanding.

In some implementations, the remote computer storage system 100 maintains a min-max heap data structure that organizes the clusters of storage blocks based on a count of storage blocks in each cluster for which a reclamation call is outstanding. Because of the properties of a min-max heap data structure, the nodes having lowest and highest counts will occupy identifiable places in the data structure and can be retrieved using data retrieval operations associated with the data structure. The remote computer storage system 100 can thus use the min-max heap to identify the clusters having the lowest and highest counts of storage blocks for which a call to reclaim is outstanding.

At step 230, the remote computer storage system 100 reclaims a portion of the storage resources in the computer remote computer storage system 100 in accordance with the cluster priority values. In some implementations, the remote computer storage system 100 reclaims all of the storage blocks in a cluster whose respective block tracking value indicates an outstanding call to reclaim those blocks as part of the same sequence of reclaim operations. In other words, the remote computer storage system 100 processes reclamation calls as a group based on the cluster affected by each call. Such a group processing of reclamation calls can decrease the number of low-level storage reclamation operations that the remote computer storage system 100 has to perform to execute tasks corresponding to reclamation calls. Group processing of reclamation calls can also decrease the number of clusters affected by the storage reclamation efforts of the remote computer storage system 100 at each time.

In some implementations, the remote computer storage system 100 reclaims storage resources in a cluster having a higher priority value before reclaiming storage resources in a cluster having a lower priority value. For example, at each iteration of the process 200, the remote computer storage system 100 can reclaim storage resources of a predetermined number of clusters that have the highest priority values, i.e., without reclaiming any storage resources in other clusters.

Such a prioritized reclamation of clusters can ensure that the remote computer storage system 100 performs storage reclamation tasks related to clusters most affected by a group of reclamation calls earlier than other clusters. Moreover, by implementing such a prioritization scheme, the remote computer storage system 100 can delay executing reclamation tasks related to lower priority clusters until the remote computer storage system 100 obtains other incoming reclamation calls affecting storage blocks in these clusters. Accordingly, the remote computer storage system 100 can process a larger number of reclamation calls for a lower priority cluster during one sequence of reclaim operations, which is more efficient than processing reclamation calls in multiple sequences of reclaim operations.

Figure 3:
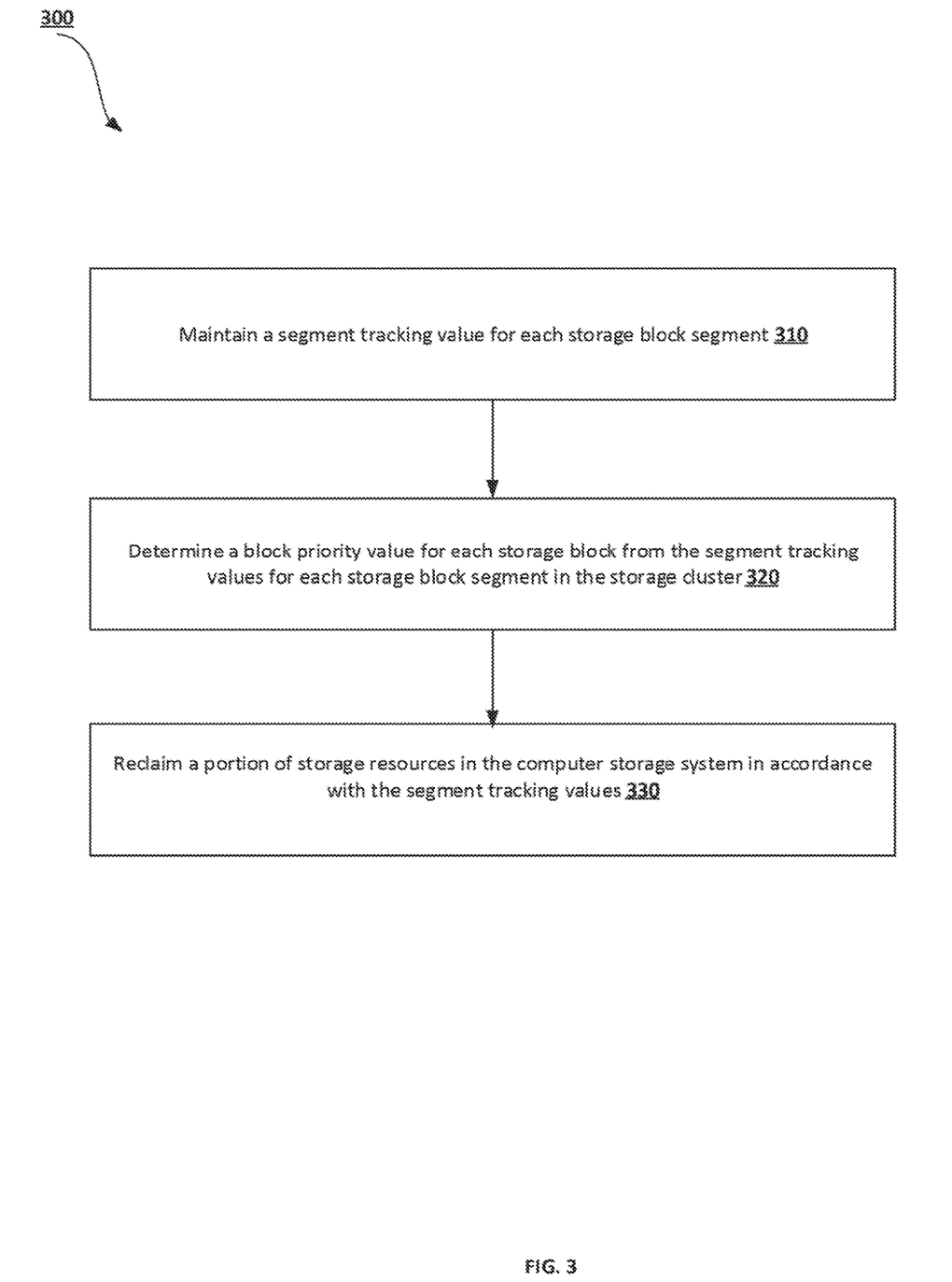
FIG. 3 is a flow chart of an example process for reclaiming storage resources in accordance with segment tracking values.

FIG. 3 is a flow chart of an example process 300 for reclaiming storage resources in accordance with segment tracking values. The process 300 is an example of a process performed by a remote computer storage system 100 of one or more computers, e.g., the remote computer storage system 100 100 of FIG. 1. The process 300 can be repeatedly performed by the remote computer storage system 100 to reclaim storage resources managed by the remote computer storage system 100 that are organized into clusters of storage blocks, where each storage block includes one or more storage block segments.

At step 310, the remote computer storage system 100 maintains a segment tracking value for each storage block segment of each storage block. The segment tracking value for each storage block segment indicates whether a call to reclaim the storage block segment is outstanding.

In some implementations, the remote computer storage system 100 maintains segment tracking values on storage resources of the system, e.g., the storage resources 111 of remote computer storage system 100 100 of FIG. 1. In some implementations, the remote computer storage system 100 maintains segment tracking values on host computer systems. e.g., host A 102A and host B 102B of remote computer storage system 100 100 of FIG. 1.

In some implementations, the remote computer storage system 100 maintains segment tracking values in two or more locations. For instance, the remote computer storage system 100 can maintain segment tracking values both on the storage resources and on the host computer systems.

In some implementations, the remote computer storage system 100 maintains each segment tracking value for a respective storage block segment as a value, e.g., a bit, that indicates whether a call to reclaim the corresponding storage block segment is outstanding.

The remote computer storage system 100 can update a block tracking value when it obtains a call to reclaim the storage block segment associated with the segment tracking value. Maintaining segment tracking values in response to such reclamation calls is described in greater detail below with reference to FIG. 4.

At step 320, the remote computer storage system 100 determines a block priority value for each storage block from the segment tracking value for each storage block segment in the storage block. The remote computer storage system 100 can assign the block priority value based on factors in addition to whether the segment tracking value for each storage block segment of the block indicates that a call to reclaim the storage block segment is outstanding.

In some implementations, the remote computer storage system 100 assigns each block priority value based on a ranking of the storage blocks by the count of storage block segments in each block whose segment tracking value indicates that a call to reclaim the storage block segment is outstanding.

In some implementations, the remote computer storage system 100 can identify the blocks having the lowest and highest counts of storage block segments for which a call to reclaim is outstanding. The remote computer storage system 100 can assign a block priority value higher than other block priority values for other storage blocks to the particular block having the highest count. The remote computer storage system 100 can also assign a block priority value lower than other block priority values for other storage block to the particular block having the lowest count. In some of those implementations, the remote computer storage system 100 assigns a medium priority value to any storage block other than the block having the lowest and highest counts of storage blocks for which a call to reclaim is outstanding.

In some implementations, the remote computer storage system 100 maintains a min-max heap data structure that organizes one or more storage blocks based on a count of storage block segments in each block for which a reclamation call is outstanding. Because of the properties of a min-max heap data structure, the nodes having lowest and highest counts will occupy identifiable places in the data structure and can be retrieved using data retrieval operations associated with the data structure. The remote computer storage system 100 can thus use the min-max heap to identify the storage blocks having the lowest and highest counts of storage block segments for which a call to reclaim is outstanding.

At step 330, the remote computer storage system 100 reclaims a portion of the storage resources in the computer remote computer storage system 100 in accordance with the block priority values.

In some implementations, the remote computer storage system 100 reclaims all of the storage block segments in a storage block whose respective segment tracking value indicates an outstanding call to reclaim as part of the same sequence of reclaim operations. In other words, the remote computer storage system 100 processes reclamation calls as a group based on the storage block affected by each call.

In some implementations, the remote computer storage system 100 reclaims storage resources in a storage block having a higher priority value before reclaiming storage resources in a storage block having a lower priority value. For example, at each iteration of the process 300, the remote computer storage system 100 can reclaim storage resources of a predetermined number of storage blocks that have the highest priority values, i.e., without reclaiming any storage resources in other storage blocks.

Reclaiming storage resources in a grouped and/or prioritized manner is described in greater detail above with reference to FIG. 2.

Figure 4:
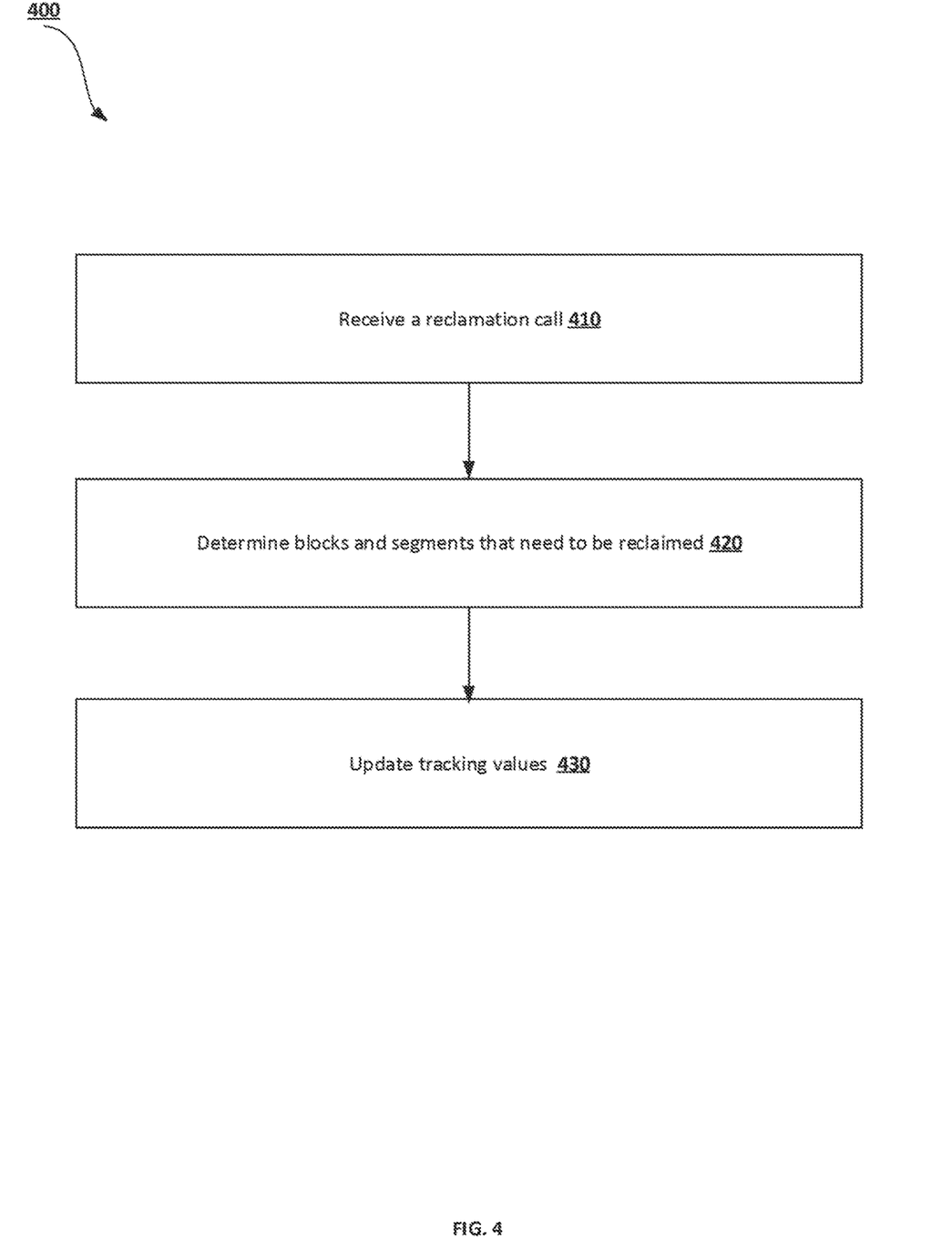
FIG. 4 is a flow chart of an example process for tracking a reclamation call.

FIG. 4 is a flow chart of an example process 400 for tracking a reclamation call. The process 400 is an example of a process performed by a remote computer storage system 100 of one or more computers, e.g., the remote computer storage system 100 100 of FIG. 1.

At step 410, the remote computer storage system 100 receives a reclamation call. The reclamation call is a call to the remote computer storage system 100 to reclaim a target portion of the storage resources of the system. The storage resources of the remote computer storage system 100 are organized into clusters of storage blocks, where each cluster includes one or more storage blocks and each storage block includes one or more storage segments.

In some implementations, the remote computer storage system 100 receives a reclamation call from a hypervisor it interacts with, e.g., hypervisor A 112A and hypervisor B 112B in FIG. 1. In some implementations, the remote computer storage system 100 generates a reclamation call using a storage management subsystem of the system, the storage management subsystem 113 of the remote computer storage system 100 of FIG. 1.

At step 420, the remote computer storage system 100 determines, based on the target portion of the reclamation call, storage blocks and storage block segments that need to be reclaimed in response to the reclamation call.

In some implementations, the remote computer storage system 100 updates a block tracking value for a storage block to indicate that the storage block needs to be reclaimed if the first target portion includes the entirety of the storage block. In some implementations, the remote computer storage system 100 updates a segment tracking value for a storage block segment if the first target portion includes the entirety of the storage block segment.

In some implementations, if the reclamation call is generated by the storage management subsystem of the system, the remote computer storage system 100 determines that the tracking values affected by the call include block tracking values only and do not include any segment tracking values. This may be because the remote computer storage system 100 recognizes that reclamation calls generated by the storage management subsystem always affect entire storage blocks and tracking them with only block tracking values, i.e., at a cluster level only, makes performing the tracking-related tasks more efficient.

At step 430, the remote computer storage system 100 updates block tracking values for the identified storage blocks and the segment tracking values for the identified storage block segments. The remote computer storage system 100 can update block tracking values and segment tracking values affected by a reclamation call either synchronously, i.e., in parallel, or asynchronously.

In some implementations, the remote computer storage system 100 performs both process 200 and process 300 repeatedly to efficiently reclaim storage resources in response to a reclamation call.

Figure 5:
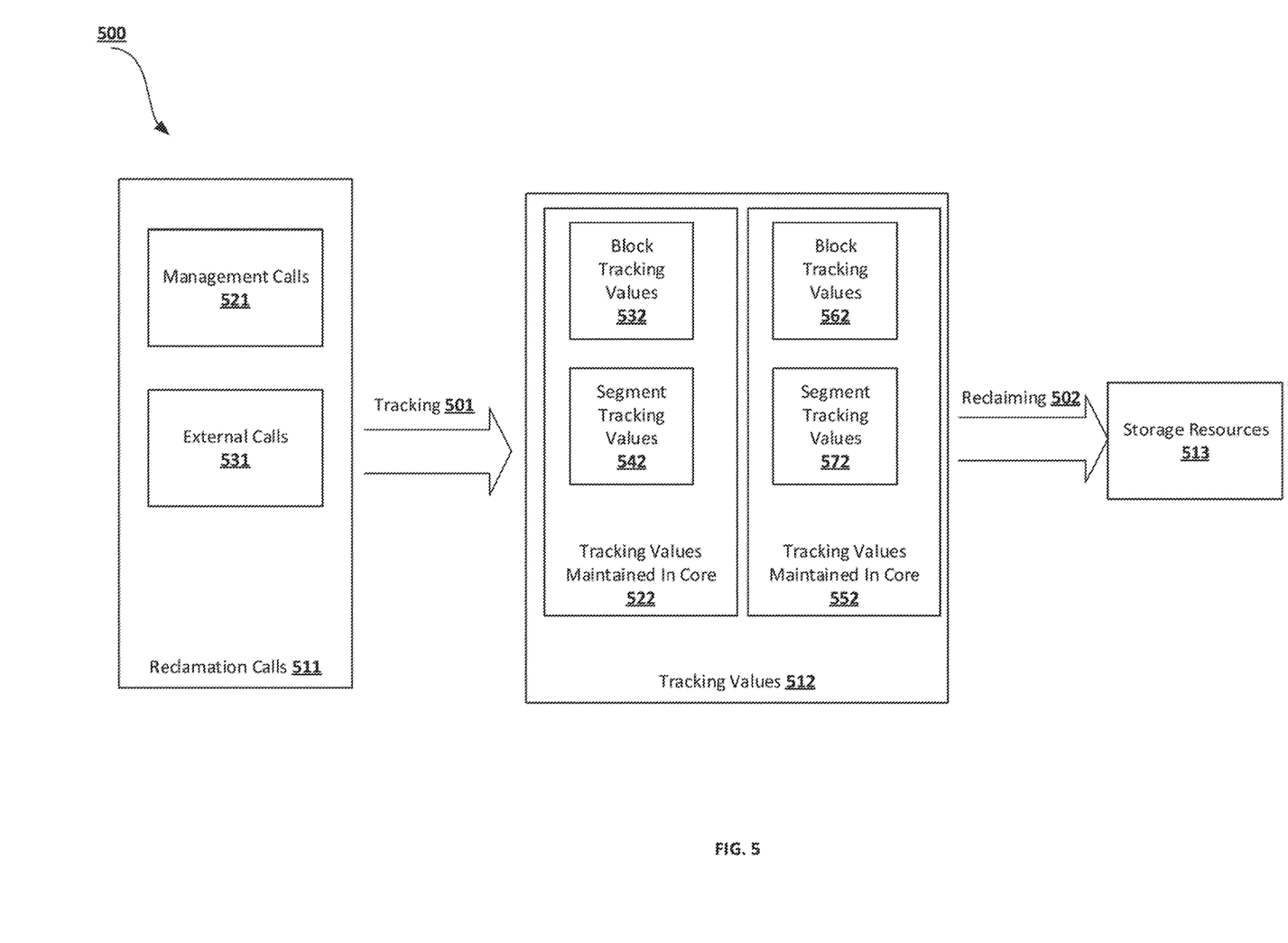
FIG. 5 is a data flow diagram of an example process for processing a reclamation call.

FIG. 5 is a data flow diagram of an example process 500 for processing a reclamation call. The process 500 can be performed by a system of one or more computers, such as remote computer storage system 100 of FIG. 1.

The process 500 includes tracking (501) reclamation calls 511 using tracking values 512 and reclaiming (502) storage resources 513 in accordance with the tracking values 512.

The reclamation calls 511 include management calls 521 and external calls 531. Management calls 521 are reclamation calls by a storage management subsystem of the system, e.g., storage management subsystem 113 of FIG. 1. External calls 531 are reclamation calls by one or more client systems interacting with the system, e.g., host A 102A and host B 102B of FIG. 1.

In some implementations, management calls 521 only call to reclaim entire storage blocks, while external calls 512 may call to reclaim both entire storage blocks and storage block segments. In other words, unlike external calls 531, management calls 521 do not call to reclaim storage block segments inside a storage block without calling to reclaim the storage block entirely.

The system may track reclamation calls in one or more storage media. In the implementations depicted in FIG. 5, the system tracks reclamation calls in core 522, i.e., in memory, or on disk 552, i.e., on a permanent storage medium such as hard disk. Moreover, the system tracks reclamation calls affecting entire storage blocks and individual storage block segments differently. The system tracks reclamation calls affecting entire storage blocks using block tracking values 532, 562 and reclamation calls affecting storage block segments using segment tracking values 542, 572. Tracking reclamation calls based on affected storage resource units is described in greater detail above with reference to FIG. 4.

The system processes the tracking values 512 to reclaim storage resources 513. When the system determines that a tracking value 512 indicates that the system has obtained a call to reclaim the storage resource, the system reclaims the storage resource.

Figure 6:
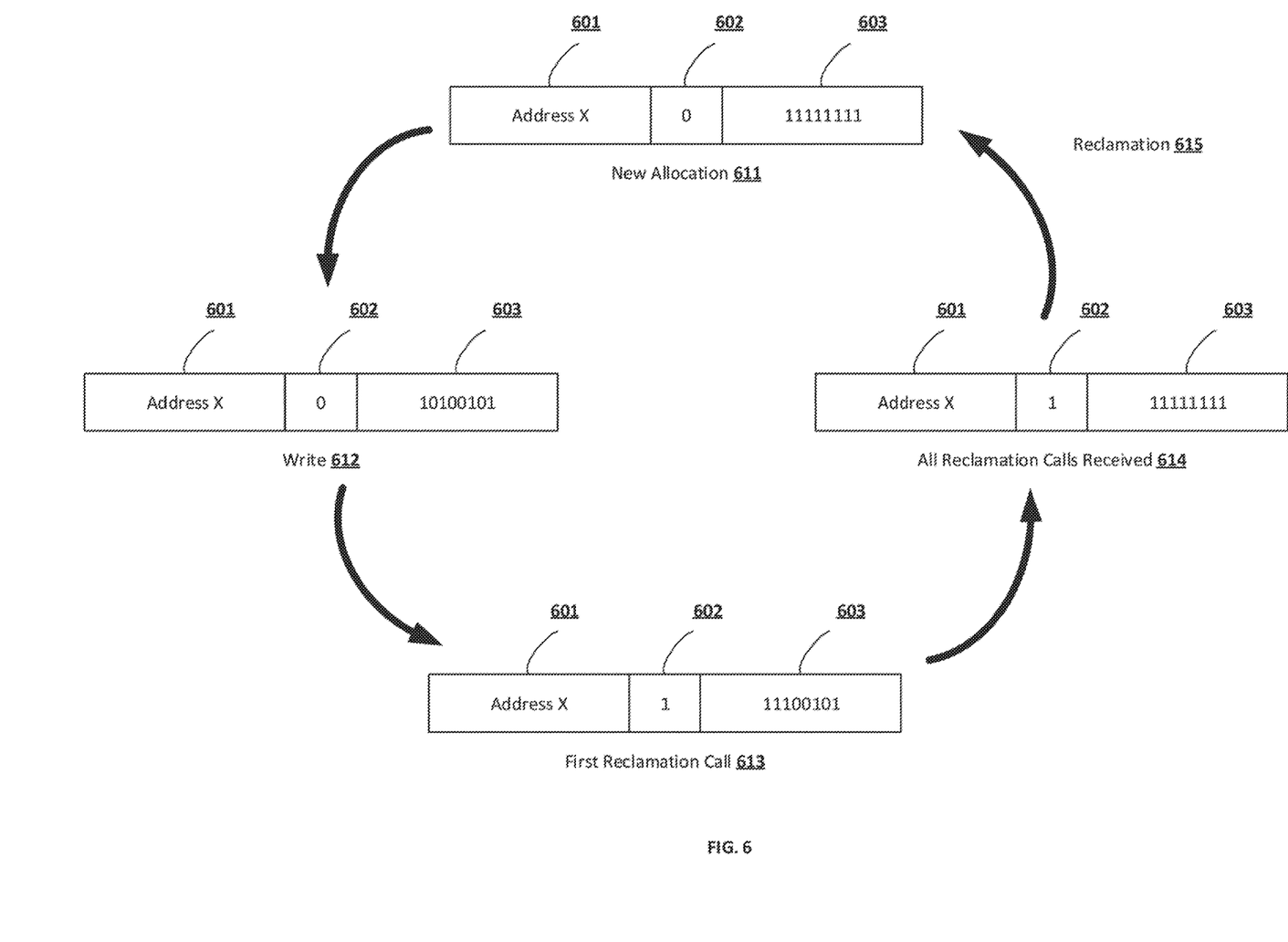
FIG. 6 depicts an operational example of tracking reclamation calls.

FIG. 6 depicts an operational example of tracking reclamation calls. In particular. FIG. 6 depicts modifications to a data structure for tracking reclamation calls during four stages. The operations depicted in FIG. 6 can be performed by a system of one or more computers, e.g., the remote computer storage system 100 of FIG. 1.

The data structure includes an address field 601, a data field 603, and a tracking indicator field 602. The address field 601 includes an identifier of the data structure. The data field 603 includes a number of bits, where each bit corresponds to a particular portion of storage resources and indicates a status of the particular portion (described in greater detail below). The tracking indicator field 602 includes a bit that denotes whether the system has received a call to reclaim at least one portion of the portions of storage resources whose status is indicated by the bits in the data field 603.

The system sets a bit of the data field 603 to "1" when it first allocates the corresponding portion of storage resources or when it receives a request to reclaim the portion. The system sets the bit to "0" if it obtains a request to write to the corresponding portion of storage resources.

In a new allocation stage 611, the system sets the tracking indicator field 602 to "0" and each bit in the data field 603 set to "1." This is because the system has not received a reclamation call or writing request affecting any portion of storage resources corresponding to the bits of the data field 603. In a write stage 612, the system obtains a request to write to portions of storage resources corresponding to the second, the fourth, the fifth, and the seventh bits from the right. The system sets those bits to "0" and maintains a "0" bit in the tracking indicator field 602.

In a first reclamation call stage 613, the system obtains a request to reclaim the storage resources corresponding to the seventh bit in the data field 602 from the right and sets that bit to "1." The system sets the tracking field 602 to "1" to indicate that it has obtained at least one request to reclaim portions of storage resources corresponding to the bits of the data field 603.

In a ready for reclamation stage 614, the system determines that the bits in the data field 603 are all "1" while the tracking indicator field is "0." This indicates that every portion of storage resources corresponding to the bits in the data field 603 is either newly allocated without any request to write or subject to a reclamation request. In other words, the system determines that it can reclaim portions of storage resources that correspond to the bits in the data field 603 without disturbing any portion of storage resources that stores data that the system has written and needs to be maintained. Therefore, the system reclaims (615) the portions of storage resources corresponding to the bits in the data field 603 to restore the data structure to its values during the new allocation stage 611.

A virtual machine is an example of a virtual computing instance. Other examples of virtual computing instances include software containers that enable operating system virtualization. While this specification discusses a remote computer storage system, e.g., remote computer storage system 100 of FIG. 1, serving virtual machines, the techniques described in this invention apply to remote computer storage systems serving other virtual computing instances such as software containers.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component. e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method for reclaiming one or more portions of storage resources in a computer system serving one or more virtual computing instances, wherein the storage resources in the computer system are organized in a plurality of clusters of storage blocks, wherein each of the plurality of clusters comprises one or more storage blocks, and wherein the method comprises:

maintaining a respective block tracking value for each storage block that indicates whether a call to reclaim the storage block is outstanding indicating that a call to reclaim the storage block has been received but has not been processed;

determining, from the block tracking values, a respective cluster priority value for each of the plurality of clusters of storage blocks, wherein the cluster priority value for each cluster is based on a ranking of the clusters according to a respective count of storage blocks in each cluster for which a call to reclaim is outstanding; and reclaiming a first portion of storage resources in the computer system in accordance with the cluster priority values including determining one or more clusters having a highest priority value and processing the calls to reclaim storage blocks for the determined one or more clusters in a batch.

2. The method of claim 1, wherein each of the storage blocks comprises a plurality of storage block segments, and wherein the method further comprises:

maintain a respective segment tracking value for each storage block segment that indicates whether a call to reclaim the respective storage block segment is outstanding;

determining, from the segment tracking values, a respective block priority value for each storage block based on a count of storage block segments in the respective storage block for which a call to reclaim the respective storage block segment is outstanding; and reclaiming a second portion of storage resources in the computer system in accordance with the block priority values.

3. The method of claim 2, further comprising:

receiving a reclamation call, wherein the reclamation call is a call to the computer system to reclaim a target portion of the storage resources in the computer system;

determining, based on the target portion, any storage blocks and any storage block segments that the computer system needs to update in response to the reclamation call; and updating block tracking values for the identified storage blocks and segment tracking values for the identified storage block segments.

4. The method of claim 3, wherein the target portion includes one or more target storage blocks and one or more target storage block segments, wherein:

the one or more target storage blocks are storage blocks in the computer system that the reclamation call releases entirely, and the one or more target storage block segments are storage block segments in the computer system that the reclamation call releases entirely.

5. The method of claim 4, wherein the reclamation call is from a hypervisor that manages at least one of the one or more virtual computing instances.

6. The method of claim 4, wherein:

the reclamation call is generated by a storage management subsystem of the computer system; and determining the block tracking values and the segment tracking values that the system needs to update in response to the reclamation call comprises determining that the system only needs to update a group of one or more block tracking values in response to the reclamation call.

7. The method of claim 2, wherein each storage block segment is determined based on a granularity value associated with the storage block that includes the respective storage block segment.

8. The method of claim 1, wherein reclaiming the first portion of storage resources in the computer system in accordance with the cluster priority values comprises:

identifying a first cluster having a highest cluster priority value relative to other clusters; and reclaiming storage blocks in the first cluster for which a call to reclaim is outstanding.

9. The method of claim 8, wherein reclaiming the first portion of storage resources in the computer system in accordance with the cluster priority values further comprises:

identifying a second cluster having a lowest priority value relative to other clusters; and delaying a reclamation of storage blocks in the second cluster for which a call to reclaim is outstanding.

10. The method of claim 9, wherein:

identifying the first and the second cluster is performed using a min-max heap data structure, and the min-max heap data structure includes a node for each cluster of the plurality of clusters and is organized based on the respective counts associated with each cluster.

11. A system comprising one or more computers and one or more storage devices storing instructions that are operable, when executed by the one or more computers, to cause the one or more computers to perform operations for reclaiming one or more portions of storage resources in a computer system serving one or more virtual computing instances, wherein the storage resources in the computer system are organized in a plurality of clusters of storage blocks, wherein each of the plurality of clusters comprises one or more storage blocks, the operations comprising:

maintaining a respective block tracking value for each storage block that indicates whether a call to reclaim the storage block is outstanding indicating that a call to reclaim the storage block has been received but has not been processed;

determining, from the block tracking values, a respective cluster priority value for each of the plurality of clusters of storage blocks, wherein the cluster priority value for each cluster is based on a ranking of the clusters according to a respective count of storage blocks in each cluster for which a call to reclaim is outstanding; and reclaiming a first portion of storage resources in the computer system in accordance with the cluster priority values including determining one or more clusters having a highest priority value and processing the calls to reclaim storage blocks for the determined one or more clusters in a batch.

12. The system of claim 11, wherein each of the storage blocks comprises a plurality of storage block segments, and wherein the method further comprises:

maintain a respective segment tracking value for each storage block segment that indicates whether a call to reclaim the respective storage block segment is outstanding;

determining, from the segment tracking values, a respective block priority value for each storage block based on a count of storage block segments in the respective storage block for which a call to reclaim the respective storage block segment is outstanding; and reclaiming a second portion of storage resources in the computer system in accordance with the block priority values.

13. The system of claim 12, further comprising:

receiving a reclamation call, wherein the reclamation call is a call to the computer system to reclaim a target portion of the storage resources in the computer system;

determining, based on the target portion, any storage blocks and any storage block segments that the computer system needs to update in response to the reclamation call; and updating block tracking values for the identified storage blocks and segment tracking values for the identified storage block segments.

14. The system of claim 13, wherein the target portion includes one or more target storage blocks and one or more target storage block segments, wherein:

the one or more target storage blocks are storage blocks in the computer system that the reclamation call releases entirely, and the one or more target storage block segments are storage block segments in the computer system that the reclamation call releases entirely.

15. The system of claim 14, wherein the reclamation call is from a hypervisor that manages at least one of the one or more virtual computing instances.

16. The system of claim 14, wherein:

the reclamation call is generated by a storage management subsystem of the computer system; and determining the block tracking values and the segment tracking values that the system needs to update in response to the reclamation call comprises determining that the system only needs to update a group of one or more block tracking values in response to the reclamation call.

17. The system of claim 12, wherein each storage block segment is determined based on a granularity value associated with the storage block that includes the respective storage block segment.

18. The system of claim 11, wherein reclaiming the first portion of storage resources in the computer system in accordance with the cluster priority values comprises:

identifying a first cluster having a highest cluster priority value relative to other clusters; and reclaiming storage blocks in the first cluster for which a call to reclaim is outstanding.

19. The system of claim 18, wherein reclaiming the first portion of storage resources in the computer system in accordance with the cluster priority values further comprises:

identifying a second cluster having a lowest priority value relative to other clusters; and     delaying a reclamation of storage blocks in the second cluster for which a call to reclaim is outstanding.

20. A non-transitory computer storage medium encoded with instructions that, when executed by one or more computers, cause the one or more computers to perform operations for reclaiming one or more portions of storage resources in a computer system serving one or more virtual computing instances, wherein the storage resources in the computer system are organized in a plurality of clusters of storage blocks, wherein each of the plurality of clusters comprises one or more storage blocks, the operations comprising:

maintaining a respective block tracking value for each storage block that indicates whether a call to reclaim the storage block is outstanding indicating that a call to reclaim the storage block has been received but has not been processed;

determining, from the block tracking values, a respective cluster priority value for each of the plurality of clusters of storage blocks, wherein the cluster priority value for each cluster is based on a ranking of the clusters according to a respective count of storage blocks in each cluster for which a call to reclaim is outstanding; and     reclaiming a first portion of storage resources in the computer system in accordance with the cluster priority values including determining one or more clusters having a highest priority value and processing the calls to reclaim storage blocks for the determined one or more clusters in a batch.

21. The method of claim 1, wherein each call to reclaim a particular storage block is received from a hypervisor indicating that the particular storage block allocated to a particular virtual machine managed by the hypervisor is to be deallocated.

* * * * *